United States Patent
Loesch et al.

(10) Patent No.: US 11,870,138 B2
(45) Date of Patent: Jan. 9, 2024

(54) MIMO RADAR SENSOR FOR MOTOR VEHICLES

(71) Applicant: Robert Bosch GmbH, Stuttgart (DE)

(72) Inventors: Benedikt Loesch, Stuttgart (DE); Michael Schoor, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 699 days.

(21) Appl. No.: 17/040,719

(22) PCT Filed: Mar. 7, 2019

(86) PCT No.: PCT/EP2019/055700
§ 371 (c)(1),
(2) Date: Sep. 23, 2020

(87) PCT Pub. No.: WO2019/219262
PCT Pub. Date: Nov. 21, 2019

(65) Prior Publication Data
US 2021/0013596 A1   Jan. 14, 2021

(30) Foreign Application Priority Data

May 17, 2018   (DE) ..................... 10 2018 207 686.3

(51) Int. Cl.
*H01Q 1/32* (2006.01)
*G01S 13/931* (2020.01)
(Continued)

(52) U.S. Cl.
CPC ......... *H01Q 1/3233* (2013.01); *G01S 13/931* (2013.01); *H01Q 21/065* (2013.01); *H01Q 21/28* (2013.01); *H01Q 23/00* (2013.01)

(58) Field of Classification Search
CPC ...... H01Q 1/3233; H01Q 1/38; H01Q 21/065; H01Q 21/28; H01Q 23/00; G01S 7/03;
(Continued)

(56) References Cited

U.S. PATENT DOCUMENTS

| 6,850,183 B2 | 2/2005 | Reeves et al. |
| 2009/0033556 A1* | 2/2009 | Stickley ............. H01Q 21/0006 342/25 A |

(Continued)

FOREIGN PATENT DOCUMENTS

| CN | 102866401 A | 1/2013 |
| DE | 102012223696 A1 | 6/2014 |

(Continued)

OTHER PUBLICATIONS

International Search Report for PCT/EP2019/055700, dated May 23, 2019.

*Primary Examiner* — Robert Karacsony
(74) *Attorney, Agent, or Firm* — NORTON ROSE FULBRIGHT US LLP; Gerard A. Messina

(57) ABSTRACT

A MIMO radar sensor for motor vehicles, having an antenna assemblage on a rectangular circuit board whose edges define a y direction and a z direction. The antenna assemblage includes at least two arrays of transmitting antennas and at least two arrays of receiving antennas. Transmitting antennas within each array are offset from one another in a z direction, and the two arrays of the transmitting antennas are offset from one another in a y direction. The receiving antennas within each array are offset from one another in a y direction, and the two arrays of the receiving antennas are offset from one another in a z direction. A high-frequency module is disposed in a central region of the circuit board between the arrays of the transmitting and receiving antennas.

6 Claims, 3 Drawing Sheets

(51) Int. Cl.
  *H01Q 21/06* (2006.01)
  *H01Q 21/28* (2006.01)
  *H01Q 23/00* (2006.01)

(58) Field of Classification Search
  CPC ........ G01S 7/032; G01S 13/42; G01S 13/931; G01S 2013/0254
  See application file for complete search history.

(56) References Cited

U.S. PATENT DOCUMENTS

2016/0131738 A1* 5/2016 Prechtel ................. H01Q 21/28
  342/175
2017/0250457 A1 8/2017 Murata et al.
2017/0322295 A1 11/2017 Loesch et al.

FOREIGN PATENT DOCUMENTS

| | | |
|---|---|---|
| DE | 102016203160 A1 | 8/2017 |
| JP | 2014530343 A | 11/2014 |
| JP | 2016166859 A | 9/2016 |
| JP | 2017534881 A | 11/2017 |
| JP | 2018503071 A | 2/2018 |
| WO | 2010122860 A1 | 10/2010 |

* cited by examiner

MIMO RADAR SENSOR FOR MOTOR VEHICLES

The present invention relates to a MIMO radar sensor for motor vehicles, having an antenna assemblage on a rectangular circuit board whose edges define a y direction and a z direction. The antenna assemblage encompasses at least two arrays of transmitting antennas and at least two arrays of receiving antennas, transmitting antennas within each array being offset from one another in a z direction while the two arrays of the transmitting antennas are offset from one another in a y direction, and the receiving antennas within each array being offset from one another in a y direction while the two arrays of the receiving antennas are offset from one another in a z direction.

BACKGROUND INFORMATION

Radar sensors are used for surroundings monitoring in driver assistance systems or in autonomous vehicle guidance systems for motor vehicles, in particular to measure distances, relative speeds, and directional angles of other vehicles and also of stationary objects. In addition to detecting the azimuth angle of an object, i.e., the angle between the forward direction of the vehicle and the line of sight to the object in a horizontal plane, it is often also necessary to detect the elevation angle, i.e., the angle between the line of sight to the object and the horizontal plane. The elevation angle permits, for example, a conclusion as to the relevance of the target, i.e., as to whether the target can be driven over or under (e.g., a bridge), or whether it is a real obstacle.

The azimuth angle and elevation angle of the targets can be ascertained from amplitudes and/or phase differences between several transmitting and/or receiving antennas of an antenna array. When several transmitting antennas and several receiving antennas are used, this is referred to as a "multiple-input multiple-output" (MIMO) system. It results in a (virtually) enlarged antenna aperture, and thus improved angular accuracy and angle separation capability.

For azimuth angle estimation, the signals received from the individual receiving antennas must be evaluated in separate evaluation channels. In order to improve angular accuracy and angle separation capability in azimuth for a given number of evaluation channels, spacings between the individual antennas which are larger than half the wavelength ($\lambda/2$) of the radar waves are often selected. This can result, however, in ambiguities that must be resolved either with the aid of a separate antenna array or with the aid of other methods, for example by tracking the localized targets over a longer period of time.

In commonly used FMCW radar sensors, the frequency of the transmitted radar signal is modulated in ramp-shaped fashion. The received signal is mixed with a portion of the signal transmitted at the reception time, thereby yielding an intermediate-frequency signal whose frequency corresponds to the frequency difference between the transmitted signal and the received signal. That frequency difference depends on the signal transit time (because of the frequency modulation) and also on the relative speed of the object (because of the Doppler effect), so that over several measurement cycles in which ramps having different slopes are traversed, information is obtained regarding the distance and relative speed of the object. The intermediate-frequency signal recorded during a measurement cycle is converted, by fast Fourier transformation (FFT), into a spectrum in which each localized object is characterized by a peak in a specific frequency bin.

Angle estimation makes use of the fact that the amplitude relationships and phase relationships of the signals obtained from the various receiving antennas are dependent characteristically on the angle of the object. So-called deterministic maximum likelihood (DML) functions, for example, are created, indicating how strongly the amplitude relationships and phase relationships actually measured for an object correlate with the theoretical amplitude relationships and phase relationships for different angle hypotheses. The angle hypothesis for which the correlation is greatest then represents the best estimated value for the angle of the object.

In order to achieve the best possible angle resolution, the antenna assemblage as a whole should have an aperture (or at least a virtual aperture) that is large as possible in both a y direction and a z direction. The antenna assemblage must therefore have relatively large dimensions, so that a correspondingly large circuit board is required. Since the circuit board must be made of an expensive high-frequency-capable material, this results in increased costs.

SUMMARY

An object of the present invention is to provide an antenna assemblage that enables high angle resolution in azimuth and in elevation, and that can nevertheless be accommodated on a compact circuit board.

The object may be achieved according to example embodiments of the present invention in that the two arrays of the transmitting antennas are disposed adjacently to two mutually oppositely located edges of the circuit board, the two arrays of the receiving antennas are disposed adjacently to the two remaining edges of the circuit board, and at least one high-frequency module is disposed on the circuit board in a central region of the circuit board between the arrays of the transmitting and receiving antennas.

With this disposition, the outer edges of the antenna arrays form a rectangular frame that define, in consideration of a certain minimum spacing between the antenna patches and the edge of the circuit board, the shape and dimensions of the rectangular circuit board. The space available on the rectangular circuit board can thereby be optimally utilized for an antenna assemblage having large apertures in azimuth and in elevation. Considerable design freedom exists in terms of selecting the exact spacings between the individual antennas, so that the antenna arrays can be configured based on the desired angular resolution and unambiguousness of the angle estimates.

A space that is not required for antenna arrays remains in the region of the center of the circuit board. This available space is used for one or several high-frequency modules that constitute the transmission and reception circuits of the radar sensor. Space utilization on the circuit board is thereby further optimized.

In an example embodiment of the present invention, the y direction is the azimuthal direction. The receiving antennas can then constitute, for instance, two arrays that extend along the upper and lower edges of the circuit board, while the transmitting antennas can constitute two arrays that extend along the lateral edges of the circuit board. In an embodiment, the transmitting antennas can be located in a z direction in the gap between the two arrays of receiving antennas. In another embodiment of the present invention, however, they can also be disposed alongside the arrays of receiving antennas so that they can utilize, in a z direction, the entire space available on the circuit board.

Exemplifying embodiments are explained in further detail below with reference to the figures.

DETAILED DESCRIPTION OF EXAMPLE EMBODIMENTS

Figure 1:
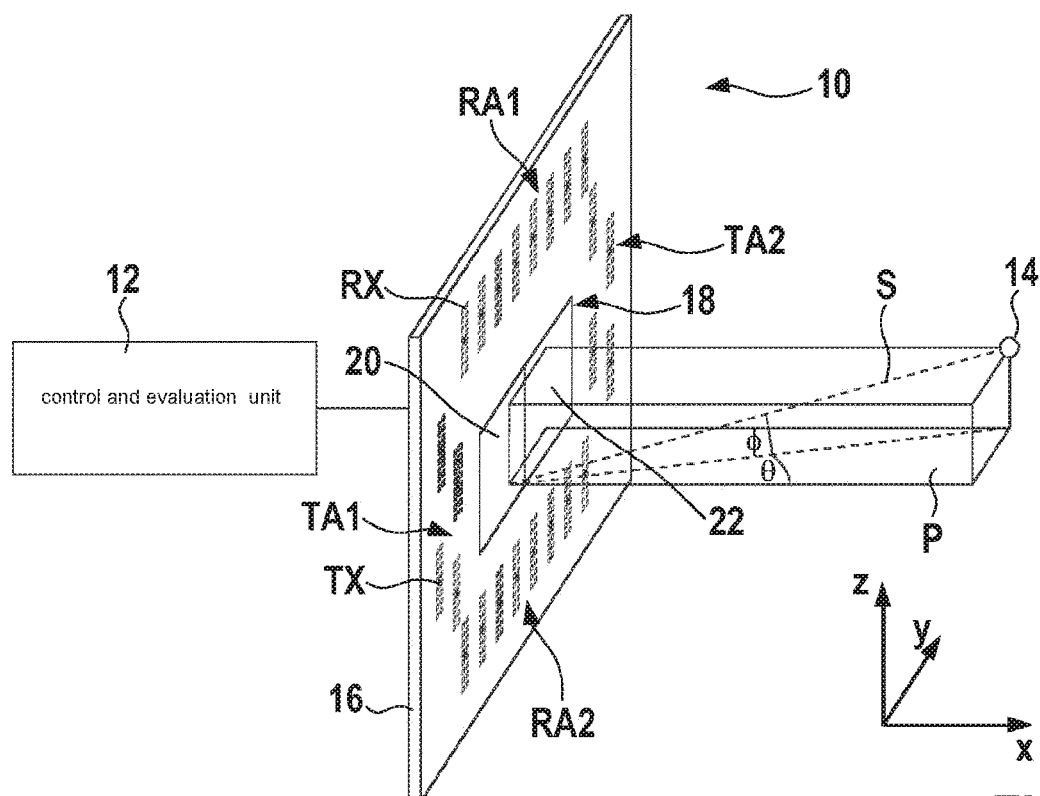
FIG. 1 schematically depicts an antenna assemblage of a radar sensor and an object to be localized with the aid of that antenna assemblage, in accordance with an example embodiment of the present invention.

FIG. 1 shows an antenna assemblage 10 and a control and evaluation unit 12 of a radar sensor that serves to measure distances, relative speeds, and directional angles of objects in accordance with an example embodiment of the present invention. A single object 14 is shown here as an example. The radar sensor is installed, for example, in the front portion of a motor vehicle (not shown), and serves in particular to detect preceding vehicles or other objects in front of the vehicle.

The radar sensor shown here is embodied especially for two-dimensional angle estimation, in which both the azimuth angle θ and the elevation angle φ of object 14 are estimated. The elevation angle φ is defined as the angle between line of sight S from the center of the radar sensor to object 14, and an azimuthal (horizontal) plane P that is spanned by a forward direction x of the vehicle and a sideways direction y. The azimuth angle θ is defined as the angle between the forward direction x and the vertical projection of the line of sight S onto the azimuthal plane P. The radar sensor is thus angle-resolving in the y direction (measuring the azimuth angle) and in the z direction (measuring the elevation angle).

In the example shown here, antenna assemblage 10 has two arrays RA1, RA2 each having eight receiving antennas RX, and two arrays TA1, TA2 each having four transmitting antennas TX, which are constituted on a rectangular circuit board 16. The edges of the circuit board extend in a y direction and a z direction.

Receiving antennas RX of each array are disposed at uniform intervals on a straight line that proceeds in the y direction. The receiving antennas thus form a so-called uniform linear array (ULA). In this example, transmitting antennas TX are embodied separately from the receiving antennas (bistatic antenna concept) and are disposed with an offset from the receiving antennas in both the y direction and the z direction.

Object 14, which in practice is considerably farther away from antenna assemblage 10 than in the schematic depiction of FIG. 1, lies within the transmission and reception lobes of all the transmitting and receiving antennas, so that a radar signal that is emitted from any of transmitting antennas TX, and is reflected at object 14, can be received by any of receiving antennas RX.

Figure 2:
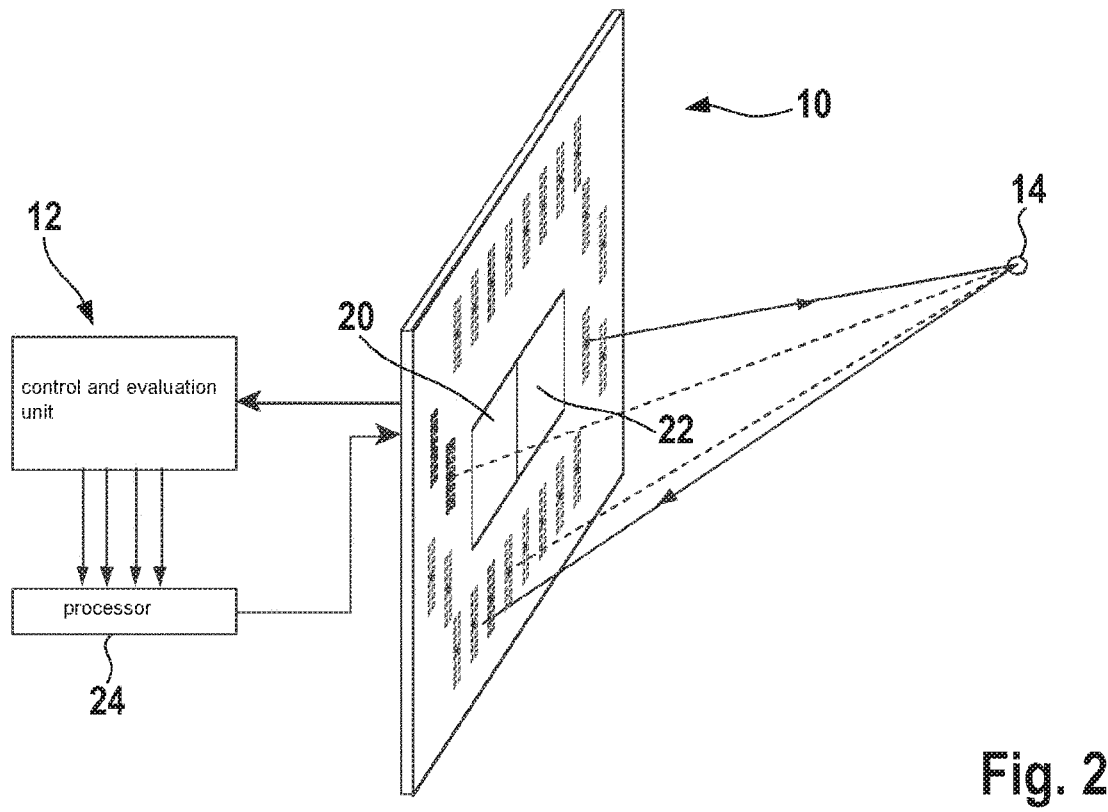
FIG. 2 is a diagram analogous to FIG. 1 to illustrate different signal propagation paths.

As an example, FIG. 2 shows with solid lines a signal propagation path that leads from one of transmitting antennas TX to object 14 and from there back to one of receiving antennas RX, and shows with dashed lines a signal propagation path for another pair of transmitting and receiving antennas. For simplicity, it can be assumed that the radar signal proceeds from a phase center of the transmitting antenna (a point at the center of the relevant group antenna) and proceeds to a corresponding phase center of the receiving antenna.

Located at the center of circuit board 16 is a high-frequency module 18, for instance a monolithic microwave integrated circuit (MMIC), having a transmitting section 20 that generates the transmitted signals for the transmitting antennas and a receiving section 22 that, in separate receiving channels, takes in the signals from receiving antennas RX and mixes them down into an intermediate-frequency band and conveys the resulting intermediate-frequency signals to control and evaluation device 12, where the signals are recorded and digitized at a specific sampling rate over one measurement cycle. This produces digitized received signals that are then further processed in a processor 24. Processor 24 also controls high-frequency module 18 and determines, inter alia, when which transmitting antenna TX transmits.

Because of the offset of the transmitting and receiving antennas, the signal propagation paths, only two of which are shown by way of example in FIG. 2, have a different length for each pairing of a transmitting antenna and receiving antenna. Although it can be assumed in general, because of the long distance between antenna assemblage 10 and object 14, that the radar waves are emitted as flat waves and also received again as flat waves, the different lengths of the signal paths result in characteristic differences in the amplitudes and phases of the signals received in the four receiving channels. These differences depend on the pairing of the transmitting and receiving antennas and on the azimuth angle θ and elevation angle φ of object 14. This effect is utilized, in the context of digital evaluation of the data in processor 24, to estimate the azimuth angle and elevation angle of the object.

Figure 3:
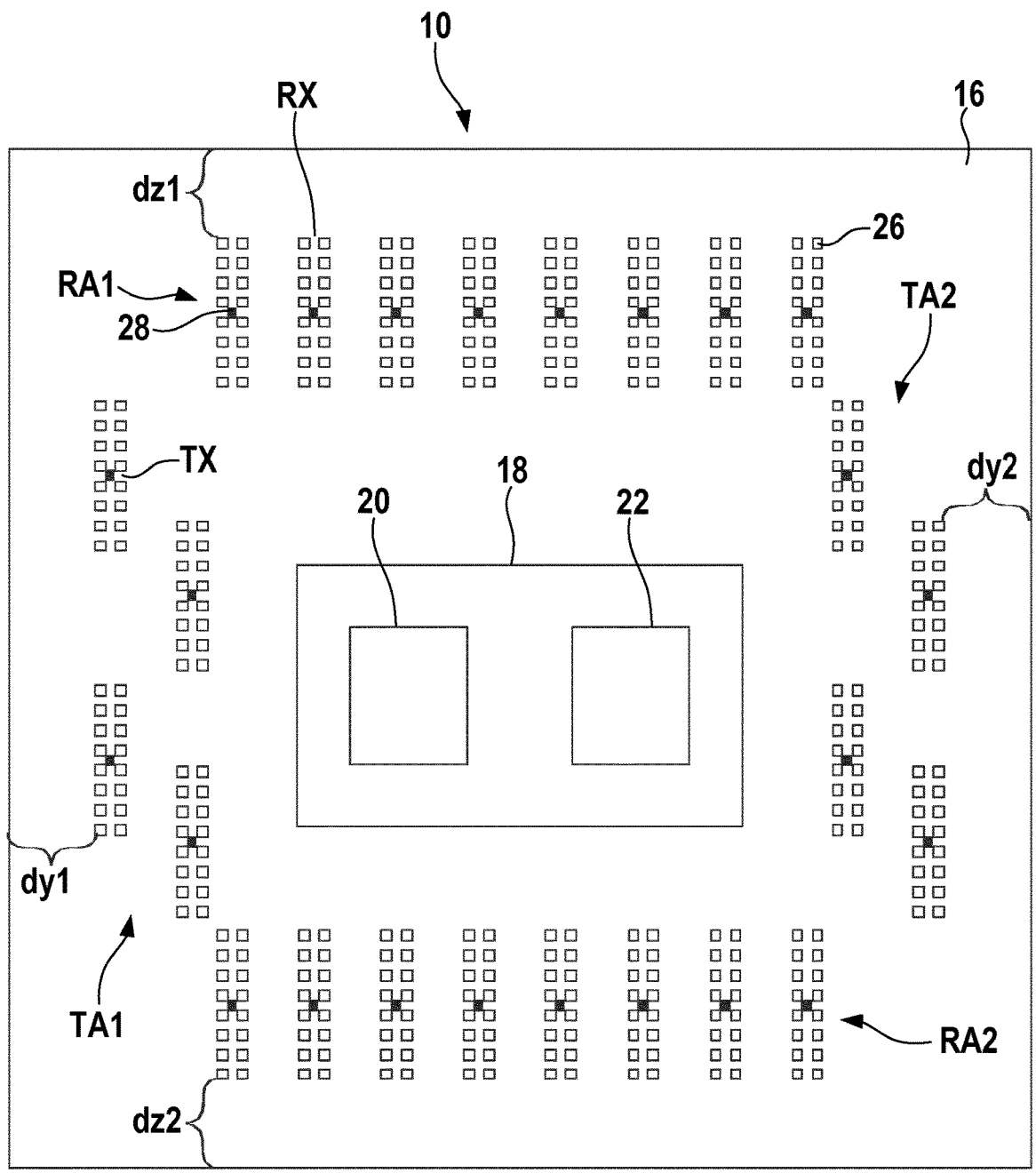
FIG. 3 is a front view of the antenna assemblage according to FIG. 1.

FIG. 3 depicts antenna assemblage 10 in greater detail. Both transmitting antennas TX and receiving antennas RX are embodied respectively as group antennas, and in the example depicted are made up of two columns proceeding vertically (in a z direction) each having eight antenna elements or patches 26. For each of transmitting antennas TX, patches 26 are supplied with in-phase transmitted signals that are provided by transmitting section 20. The column-shaped disposition of patches 26 produces a bundling of the emitted radar radiation, especially in elevation. Phase centers 28 of the group antennas are marked with black squares in FIG. 3.

In this example, receiving antennas RX are likewise made up of patches 26 that have the same arrangement as the patches in the transmitting antennas. For each individual receiving antenna, the signals received by the individual patches 26 are combined by signal leads (not shown) into a single signal, without thereby modifying the phase relationships between the signals from the different patches. In this example the reception lobes of the receiving antennas therefore have the same shape as the transmission lobes of the transmitting antennas.

Patches 26 of the transmitting antennas and receiving antennas are square and have an edge length of $\lambda/4$, where $\lambda$ is the (average) wavelength of the emitted radar waves. The spacing from patch to patch within each group antenna is therefore $\lambda/2$ in both the horizontal and the vertical. The eight receiving antennas RX of each array RA1, RA2 are disposed at intervals of $2\lambda$, i.e., the spacing between the phase centers of two adjacent receiving antennas in a y direction is equal to $2\lambda$. In a z direction, the antennas of each array are at the same height. The upper edges of the antennas of array RA1 are therefore all at the same distance dz1 from the upper edge of circuit board 16, and the lower edges of the antennas of array RA2 are correspondingly all at the same distance dz2 from the lower edge of the circuit board.

Arrays TA1, TA2 of transmitting antennas TX are located, in a z direction, entirely within the gap between arrays RA1, RA2 of the receiving antennas. Within each array, the four transmitting antennas are offset from one another in a z direction and form two pairs of antennas that are at the same height in a y direction. The left edges of the two outer antennas of array TA1 are thus at the same distance dy1 from the left edge of circuit board 16. The right edges of the two outer antennas of array TA2 are also at the same distance dy2 from the right edge of the circuit board. The offsets of the antennas from one another are different but are each equal, in both a y direction and a z direction, to an integral multiple of $\lambda/2$. The offsets in the two arrays TA1 and TA2 furthermore match one another, so that array TA2 is a shifted copy of array TA1.

In a first measurement cycle, transmission occurs with only one of transmitting antennas TX of one of the two arrays. When transmission then occurs in the next measurement cycle with a different antenna TX2, the situation that results in terms of wave propagation is equivalent to the case in which transmission occurs with the first antenna but all the receiving antennas RX are offset by the same amount as and in the opposite direction from the two transmitting antennas. If all eight transmitting antennas TX are then activated in succession, what is thereby obtained is a virtual receiving array that is made up of eight mutually offset copies of the two arrays RA1 and RA2. A considerable enlargement of the aperture is thus achieved in both a y direction and a z direction, so that more clear-cut phase differences occur and a sharper angle separation is thereby made possible.

Because the transmitting antennas in arrays TA1 and TA2 are offset from one another in a y direction and are also offset by different distances from one another in a z direction, the antenna spacings in the virtual array are not entirely uniform. This produces design freedom for optimizing the virtual array in terms of respective requirements. In general, larger gaps between the virtual antennas will produce an enlargement of the aperture, while on the other hand increasing the filling of the gaps reduces the opportunity for ambiguities in angle determination to occur.

In antenna assemblage 10 shown in FIG. 3, arrays RA1 and RA2 of the receiving antennas extend along the upper and lower edges of circuit board 16, while arrays TA1 and TA2 of the transmitting antennas extend along the vertical edges of the circuit board. The (real) arrays RA1 and RA2 of the receiving antennas therefore already have, inherently, a large aperture in a y direction. Because arrays TA1 and TA2 of the transmitting antennas are furthermore at the greatest distance from one another in a y direction allowed by the width of circuit board 16, the virtual aperture for angle determination in azimuth is maximized. Because arrays RA1 and RA2 of the receiving antennas are at the greatest distance from one another in a z direction allowed by the height of circuit board 16, and the gaps between those two arrays are filled by the virtual array, for given dimensions of circuit board 16 the aperture for angle determination is also maximized in elevation.

Because the remaining open space within circuit board 16 is used for high-frequency module 18 and for the leads to the transmitting and receiving antennas, available space on circuit board 16 is optimally utilized, so that optimum performance is achieved for given material costs for circuit board 16.

Figure 4:
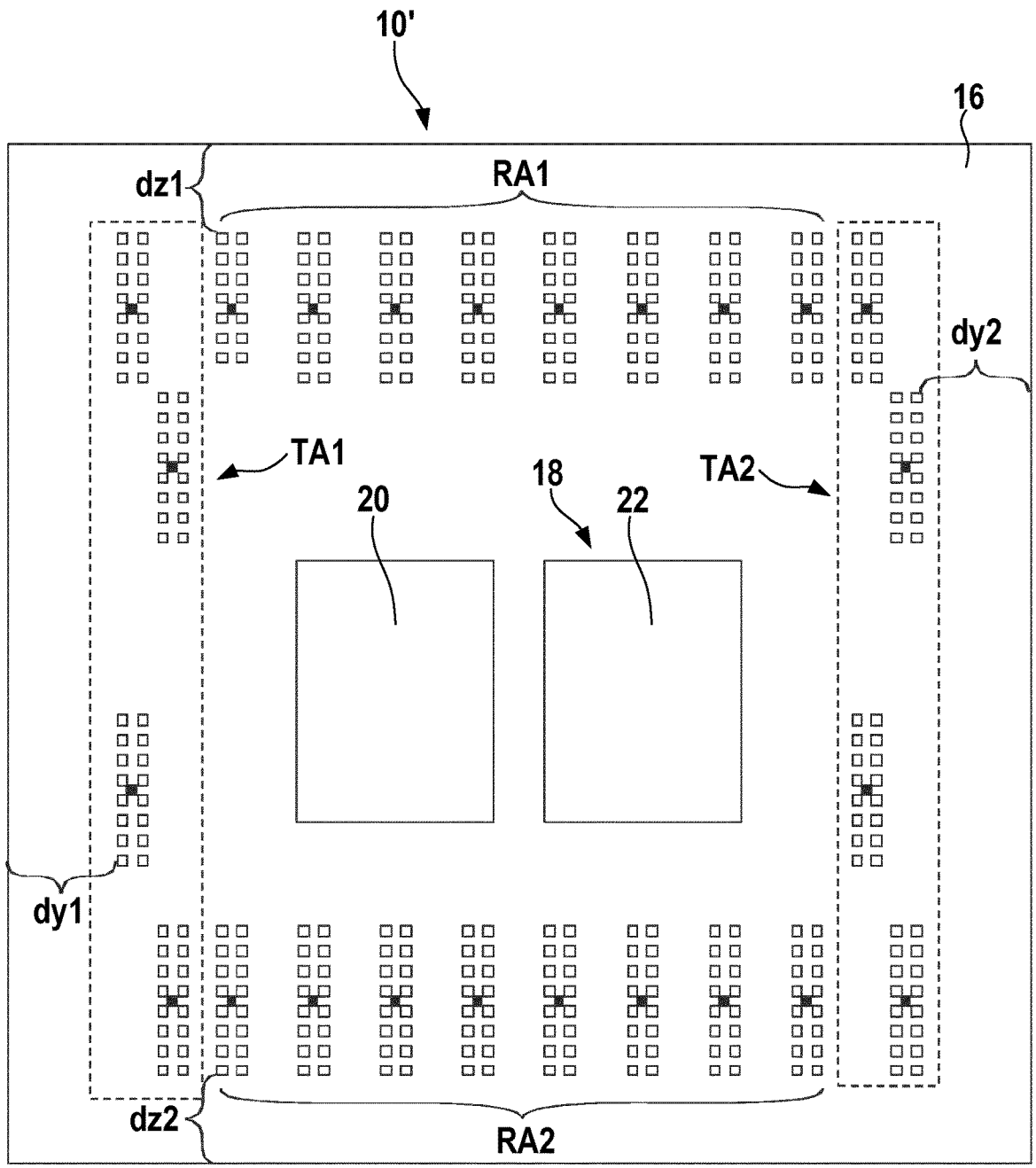
FIG. 4 shows an antenna assemblage according to another exemplifying embodiment of the present invention.

FIG. 4 shows, as a further example, a slightly modified antenna assemblage 10' in which arrays TA1 and TA2 of the transmitting antennas (outlined with dashed lines in the drawing) extend over the entire available height of circuit board 16 and are disposed alongside the opposite ends of arrays RA1 and RA2 of the receiving antennas. This allows a further enlargement of the aperture in a z direction.

What is claimed is:

1. A MIMO radar sensor for a motor vehicle, comprising:
an antenna assemblage on a rectangular circuit board whose edges define a y direction and a z direction;
wherein the antenna assemblage includes two arrays of transmitting antennas and two arrays of receiving antennas,
wherein transmitting antennas within each array of the two arrays of transmitting antennas being offset from one another in the z direction, and the two arrays of transmitting antennas are offset from one another in the y direction,
wherein receiving antennas within each array of the two receiving antennas being offset from one another in the y direction, and the two arrays of receiving antennas are offset from one another in the z direction,
wherein the two arrays of transmitting antennas are disposed adjacently to two mutually oppositely located edges of the circuit board,
wherein the two arrays of receiving antennas are disposed adjacently to two remaining ones of the edges of the circuit board, and
wherein at least one high-frequency module is disposed on the circuit board in a central region of the circuit board between the two arrays of transmitting antennas and the two arrays of receiving antennas, and
wherein the two arrays of transmitting antennas each include at least two transmitting antennas that are disposed at a same distance from a respective edge of the circuit board, and the two arrays of receiving antennas each include at least two receiving antennas that are disposed at a same distance from a respective edge of the circuit board.

2. The MIMO radar sensor as recited in claim 1, wherein the two arrays of transmitting antennas occupy, in a z direction, only a space between the two arrays of receiving antennas.

3. The MIMO radar sensor as recited in claim 1, wherein the two arrays of transmitting antennas in the y direction are disposed outside a region of the two arrays of receiving antennas, and, in the z direction, overlap with the two arrays of receiving antennas.

4. The MIMO radar sensor as recited in claim 1, wherein the two arrays of receiving antennas are uniform linear arrays (ULA).

5. The MIMO radar sensor as recited in claim 1, wherein the two arrays of transmitting antennas in the y direction are disposed outside a region of the two arrays of receiving antennas, and, in the z direction, overlap with the two arrays of receiving antennas, and wherein the two arrays of receiving antennas are uniform linear arrays (ULA).

6. The MIMO radar sensor as recited in claim 1, wherein the two arrays of transmitting antennas occupy, in a z direction, only a space between the two arrays of receiving antennas, and wherein the two arrays of receiving antennas are uniform linear arrays (ULA).

* * * * *